US006187212B1

(12) United States Patent
Simon et al.

(10) Patent No.: US 6,187,212 B1
(45) Date of Patent: Feb. 13, 2001

(54) DEVICE FOR BALANCED UNIFORM FLOW AND SIMPLIFIED CONSTRUCTION TO REMOVE FLUID FROM AN INK JET PRINTER

(75) Inventors: Robert J. Simon, Bellbrook; Bruce A. Bowling, Beavercreek, both of OH (US)

(73) Assignee: Scitex Digital Printing, Inc., Dayton, OH (US)

( * ) Notice: Under 35 U.S.C. 154(b), the term of this patent shall be extended for 0 days.

(21) Appl. No.: 09/211,517

(22) Filed: Dec. 14, 1998

(51) Int. Cl.[7] ..... G01D 15/18
(52) U.S. Cl. ..... 216/27; 216/41; 347/90
(58) Field of Search ..... 216/27, 41; 347/85, 347/90

(56) References Cited

U.S. PATENT DOCUMENTS 3,936,135 * 2/1976 Duffield ..... 347/1
4,250,510 * 2/1981 Dressler ..... 347/76
4,307,407 * 12/1981 Donahue et al. ..... 347/76
4,857,940 * 8/1989 Rueping ..... 347/90
5,105,205 * 4/1992 Fagerquist ..... 347/90
5,469,202 * 11/1995 Stephens ..... 347/90

* cited by examiner

*Primary Examiner*—Randy Gulakowski
*Assistant Examiner*—Shamim Ahmed
(74) *Attorney, Agent, or Firm*—Barbara Joan Haushalter

(57) ABSTRACT

The present invention provides for an improvement in the removal of fluid from an ink jet printhead. A branched structure having multiple groups of branches creates a flow geometry, with each group of branches having a connecting trunk. The fluid flow is then able to be directed from each plurality of branches down the connecting trunk. Pressure drops at the branching nodes are minimized by directing the flow from the combined branches down the connected trunk. Expansion losses at the branching nodes are minimized by funneling down the flow at the branching nodes, with the trunk having a narrower channel than the combination of the joined branches.

15 Claims, 1 Drawing Sheet

DEVICE FOR BALANCED UNIFORM FLOW AND SIMPLIFIED CONSTRUCTION TO REMOVE FLUID FROM AN INK JET PRINTER

TECHNICAL FIELD

The present invention relates to continuous ink jet printers and more particularly to removal of fluid from an ink jet printhead.

BACKGROUND ART

In continuous ink jet printing, ink is supplied under pressure to a manifold that distributes the ink to a plurality of orifices, typically arranged in linear array(s). The ink is expelled from the orifices in jets which break up due to the surface tension of the ink into droplet streams. Ink jet printing is accomplished with these droplet streams by selectively charging and deflecting some droplets from their normal trajectories. The deflected or undeflected droplets are caught and re-circulated and the others are allowed to impinge on a printing surface.

Continuous ink jet printing requires rows of ink drops that are emitted at a high rate of speed and pressure from a stimulated body. Some drops are deflected and recovered for use again. The mix of deflected verses non-deflected drops form text and graphics on a substrate that moves under the stimulated body. To recover the deflected drops, catcher means such as shown in U.S. Pat. No. 4,757,329 have been used. As discussed in the '329 patent, drops are caught by impacting on a flat or sloping surface of the catcher face. The ink then flows down the catcher face and flows around a radius at the bottom of the face to enter the ink return channel of the catcher. The ink return channel is defined by an opening and flow channel between the catcher body and a catcher plate, which is bonded to the bottom of the catcher body. Ink can be removed from the ink return channel by means of a vacuum, as described in U.S. Pat. No. 3,936,135; or by gravity drain, as described in U.S. Pat. No. 4,929,966. The return channel should be configured to insure uniform ink removal across the width of the ink jet array. Furthermore, the flow of air into the ink return channel should be held to a minimum to minimize foam generation in the fluid system and to minimize the disturbance of the ink drops by the air flow. The art is replete with various channel geometries, developed for this purpose, including those shown in U.S. Pat. Nos. 3,936,135; 5,105,205; and 5,469,202. In some, the flow is managed by first forcing the fluid through a narrow gap between the catcher and the catcher plate and then opening up flow channel up to form a larger plenum. By means of the pressure drop associated with the fluid meniscus at the entrance to the ink return channel and the pressure drop produced by the sudden expansion into the larger plenum, these designs control the rate of air flow into the catcher and minimize the effects of pressure variations across the array width produced within the ink return channel. Other configurations make use of a screen at the entrance to the ink return channel. The screen effectively divides up the entrance to the flow channel into numerous small segments. By so doing, the magnitude of the pressures associated with the meniscus at the entrance to the ink return channel is increased due to the sudden expansion of the flow channel into the plenum. Consequently, the existing art has attempted to manage the fluid flow by maintaining a relatively high pressure drop at the entrance to the ink return channel, with a larger plenum having lower pressure drops down stream. In this way, pressure variations produced within the plenum across the width of the array are overwhelmed by the larger entrance pressure drops. This allows the ink to be removed uniformly across the width of the array.

In addition to removing ink uniformly while the printhead is in the operating condition, the catcher means has to be able to remove ink uniformly during the startup sequence when the ink is deflected into the ink return channel by the eyelid. In this condition the ink enters the ink return channel with relatively low kinetic energy. Under such conditions, the high entrance losses of the prior art solutions have tended to provide too much restriction for adequate ink removal.

It is further noted that the manufacturing cost of components is often an issue. For example, in U.S. Pat. 4,857,940, the manufacturing cost of the catcher means was addressed by molding the catcher. While molding can be used for short arrays, for long ink jet arrays the catcher means cannot be molded to the required tolerances. Machining the ink return channel into the catcher can be an expensive operation. To get the desired flow geometries can require complex shapes, which are difficult to machine. This machining of this flow geometry is made more difficult by the need to have a smooth transition to the radius at the bottom of the drop impact face on the front of the catcher. Furthermore, the machining of the ink return channel can produce distortion in the catcher so that the drop impact face and the charge plate bonding surface are no longer flat enough for proper operation.

Furthermore, to securely bond the catcher plate to the bottom of the catcher, it is desirable to roughen the surface of the catcher plate. Typically this is done by grit blasting the catcher plate. Grit blasting however tends to distort the thin plate, which can in turn lead to bond failures.

It is seen, therefore, that a need exists for an improved means for removing fluid from an ink jet printhead. The desired improved means would preferably provide for uniform ink removal without the associated large pressure drops at the entrance of the ink return channel seen in the existing art. Additionally, the desired improved means would preferably provide for improved fabrication of the ink return channel which overcomes problems associated with the prior art fabrication means. Finally, the improved construction would preferably include an improved means for securely bonding the catcher plate to the bottom of the catcher which addresses the bond failures found in the prior art.

SUMMARY OF THE INVENTION

It is the object of the present invention to eliminate the high pressure drops at the entrance to the ink return channel by eliminating the rapid expansion of the flow channel after the entrance section to the return channel. The need for high entrance pressure drops is eliminated by the present invention by utilizing a branching flow channel geometry. This flow channel geometry balances the pressure drops in each branch of the structure and avoids turbulence-producing flow junctions and turns. The present invention eliminates the complex operation of machining the ink return channel into the catcher, by transferring the channel geometry from the catcher to the catcher plate. This not only reduces the manufacturing costs but also improves the rigidity of the catcher. For a long array printer the improved rigidity can be very significant. The invention further reduces the cost of production by utilizing a stress free process to machine the flow channel. This eliminates the need for post machining processes to correct the distortion produced in the part.

Furthermore, the present invention provides means to enhance the bonding of the catcher plate to the catcher by using stress free processes to produce the desired surface roughness of the bonding surface. Hence, the present invention solves the problems in the existing art by applying balanced flow geometry using pressure drop as a design advantage, matching design requirements to manufacturing techniques, and using area and shapes to ensure bond strength while removing machining stress and costs.

Other objects and advantages of the invention will be apparent from the following description and the appended claims.

DETAILED DESCRIPTION OF THE INVENTION

In accordance with the present invention, an apparatus is proposed for providing balanced fluid flow and ink removal, incorporating effective and cost sensitive geometry and enhanced lamination features for an ink jet printhead. A catcher plate is provided, having tributary fluid paths from the print deflection area of an ink jet printhead. The catcher plate is produced via a chemical machining process which allows complex contours and attachment features to be created at little cost.

Figure 1:
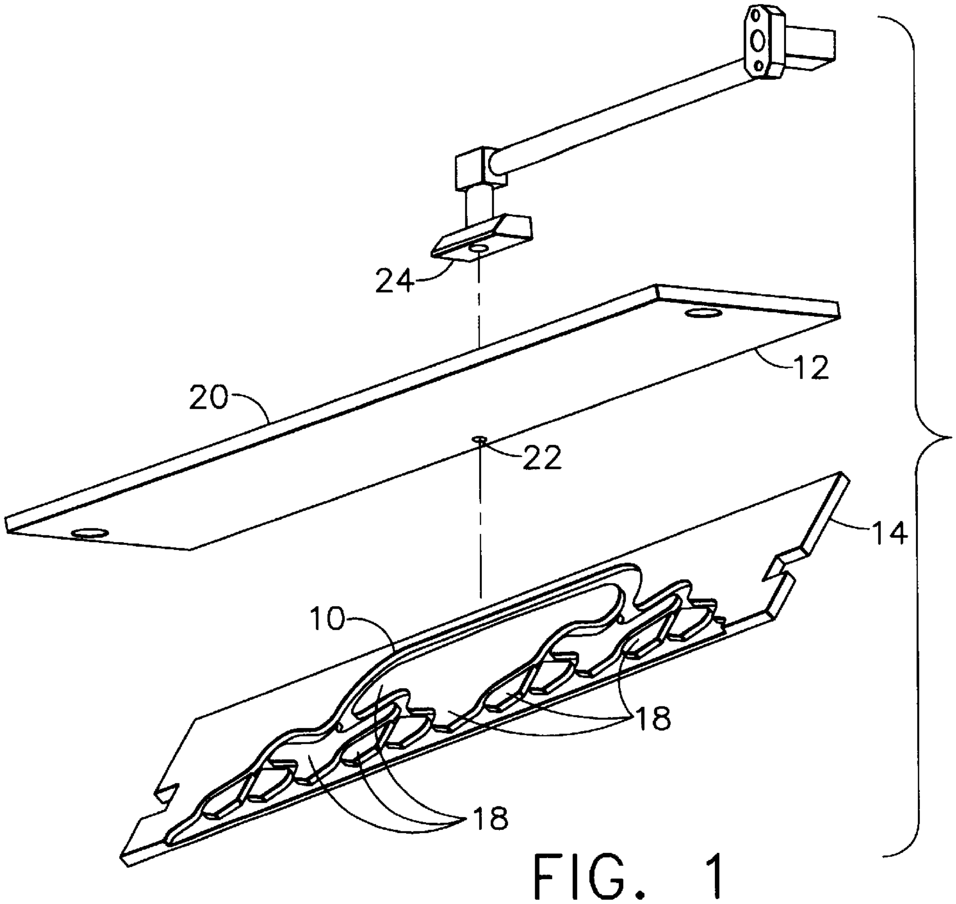
FIG. 1 is an exploded view of a catcher body/plate assembly, constructed in accordance with the present invention.

Referring now to the drawings, FIG. 1 illustrates an exploded view of the catcher body/plate construction according to the present invention. An ink return channel 10 is defined between a catcher body 12 and a catcher plate 14. Catcher 12 has a fluid film area 20 and an aperture 22 associated with an evacuation port or vacuum line 24.

The flow path or ink return channel 18 proposed is fundamentally different from previous paths. In the existing art, a minimal and tightly controlled pressure drop value through the catcher and mating plate has been desirable. That value has been maintained at or below five inches of water. The present invention abandons the approach of the existing art, instead proposing a novel approach that uses a pressure drop of up to 100 inches of water and a balanced flow/pressure drop.

This balanced flow/pressure drop approach uses a multiple branching structure for removing ink from the catcher. The pressure drops in each of the branches are matched to others across the width of the catcher. To balance the pressure drops in the channels, one makes use of the following equation. The pressure drop for a flow channel is given by:

$$\Delta P = f * \frac{L}{D} * \frac{V^2}{2}$$

where:

f is a is a constant called the friction factor, and it is uniform for all flow channels;

V is the flow velocity, and the flow velocity is the same at the entrance to each flow channel. As the flow channels decrease in width, the flow velocity increases.

L is the length of each flow path;

D is the hydraulic diameter of the flow channel. For rectangular flow channels, one can use for D four times the area/perimeter of the flow path.

Figure 3:
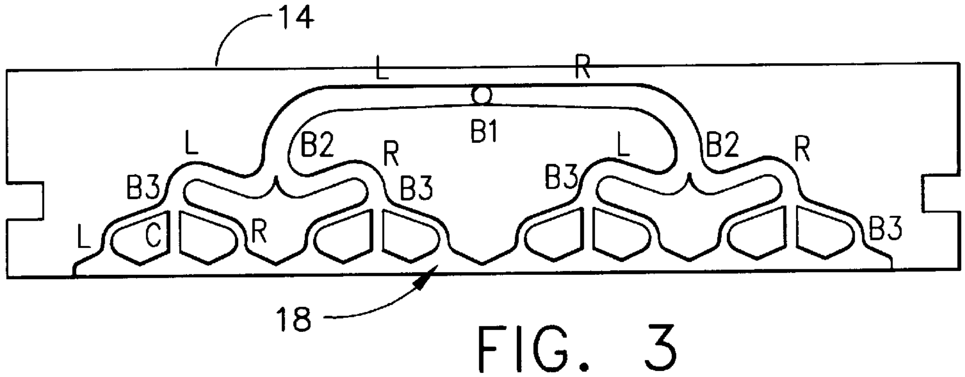
FIG. 3 is a plane view showing the flow channel branching structure.

From this equation, and referring to FIG. 3, it is clear that the L/D ratio must be the same for each split of a branch. If one flow path must be longer than another from the same branching point, the longer one needs to have a large value of D, a wider channel is needed. This is seen at the B3 branching, illustrated in FIG. 3. The left and right branches are longer than the center branch. To properly balance the pressure drops, the outer channels have wider channels then the center one. At the other branch levels, B1 and B2, the two branches are symmetric so that the pressure drops are equal. At the B1 branching point, the fluid from the left and right branches join to flow out perpendicular to the plane shown. This exit port is shown in FIG. 1.

Also in FIG. 3, pressure drops at the branching nodes are minimized by directing the flow from the combined branches down a connected trunk. The trunks from the B3 branching nodes form the branches for the B2 branches. At B1 the fluid is removed by means of a port perpendicular to the plane of these flow channels. Therefore, the branching junctions are designed to avoid pressure drops at the junctions. This is accomplished by avoiding right angle T junctions. Rather, the branches enter the junction or trunk in a way the directs the fluid down the desired flow channel. Furthermore the trunk into which the branches flow is narrower than the combined width of the branches. In this way pressure drops associated with expansion zones are eliminated.

Conventional machining of the balanced flow paths of the present invention is difficult because of spline shaped features with sharp internal and external features. The lengths of these features and the materials that are machined in dictate a slow, and highly tooled/fixtured machining path, adding great cost to the final assembly. Also, because this geometry historically resides in the precision catcher, high amounts of stress are induced into the catcher from the machining operation. This stress can cause reliability problems as it slowly releases over time.

The present invention takes this flow channel geometry out of the catcher 12 and puts it, instead, into the plate 14 that is bonded to the catcher, as illustrated in FIG. 1. This simplifies the catcher, maintaining its cross-section for strength. It further eliminates stresses in the catcher normally produced by machining the flow geometry. The result is a lower cost catcher assembly which is more robust than previous ones.

Figure 2:
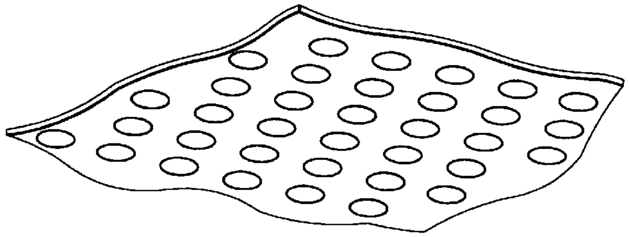
FIG. 2 is an enlarged view of depth etch features of the catcher plate in FIG. 1.

Continuing with FIGS. 1 and 2, the new balanced flow channel geometry can be fabricated into the plate 14, using any of a variety of suitable processes or methods. Conventional machining of the complex contours of the flow geometry can be quite expensive. Furthermore, as the plate is quite thin, the plate is subject to distortion if stress inducing fabrication processes, such as conventional machining, are used. It is therefore desirable to employ stress free fabrication processes. These include chemical and electrochemical processes.

One preferred method involves applying a mask pattern to the plate 14. The unmasked areas are then chemically etched to the desired depth. The mask pattern may by applied by photolithographic processes. For some flow geometries the mask could be applied by a screening or a stenciling process. As the complex flow geometry is defined by a mask, which can be replicated on a large number of parts, this process can be quite inexpensive.

Alternatively, an electrochemical machining (ECM) process, or a depleting process, could be used to machine the flow channel geometry. The ECM process requires an electrode to be machined to mirror the flow channel geometry. The machined contour matching electrode and the catcher plate are then placed in close proximity to each other in a ECM bath and an appropriate voltage is applied between them. Metal is deplated from the catcher plate in the areas defined by the machined electrode. The electrochemical machining process is also a stress free means of machining. As the contour matching electrode can be used for a large number of parts, this too is an inexpensive process.

In yet another embodiment, the ECM process is used, but the geometry is defined by a masking operation, such as photolithography, instead of the contour matching electrode.

Furthermore, since these processes provide an inexpensive and effective means for machining without inducing stresses in the part, the same processes could be used to machine the geometry into the catcher 12, rather than into the catcher plate 14. Of course, those skilled in the art will recognize that while such an approach reduces cost relative to the prior art methods, it also removes material from the catcher, thereby reducing its rigidity. This can be undesirable for a long array printhead. Blending the radius at the bottom of the catcher impact surface into the ink return channel is also more difficult when the return channel is machined into the catcher.

An additional means for inexpensive fabrication of the ink return channel is to use a lamination process. Out of a plate having a thickness corresponding to the thickness of the desired flow channels, the islands and side walls of the flow channel, i.e., those areas which would not have been machined by the chemical machining operation, are cut. These parts are then bonded into place between the catcher and non-contoured catcher plate. These spacer plates could be fabricated by a stamping or punching process. A electro-discharge machining process could also be used to machine are large number of such parts simultaneously.

Also unique to the present invention is the elimination of the grit blasting requirements on the plate 14 and catcher 12, while still maintaining high bond strength between the two components. As mentioned above, grit blasting deforms the plate and creates undesirable stresses in the catcher. To eliminate grit blasting stress and create improved bond strength, the etching process used to define the flow geometry is used. Small, approximately hemispherical bond enhancing features 16, as illustrated in FIG. 2, that are approximately 0.010" in diameter, and approximately 0.02" apart with dithered rows and columns, and approximately 0.0004" to 0.0006" deep, are etched into the surface of the plate 14 at the same time that the balanced flow geometry is etched. The additional area created by the spherical features allows for the grit blasting requirement to be eliminated from the catcher, thereby maintaining high bond strength. Additionally, etching the spherical bond enhancing features into the plate instead of grit blasting the catcher and plate represent a significant cost savings. Other bond enhancing features can be employed instead of the hemispherical features described above. Such bond enhancing features could include patterns of small pits of any shape, or narrow lines fabricated into the catcher pan.

The present invention provides for an improved means for removing fluid from an ink jet printhead. A branched structure comprised of multiple groups of branches creates a flow geometry, with each group of branches having a connecting trunk. The fluid flow is then able to be directed from each plurality of branches down the connecting trunk. Fluid is removed at B1 using a port perpendicular to the plane of these flow channels. Pressure drops at the branching nodes are minimized by directing the flow from the combined branches down the connected trunk. Expansion losses at the branching nodes are minimized by funneling down the flow at the branching nodes, with the trunk having a narrower channel than the combination of the joined branches.

The flow geometry is produced by a stress free fabrication process, where the stress free process may be by a masking process, chemical etching or electrochemical processes, or other suitable means. The flow geometry is preferably fabricated into the catcher plate. Spacers may be laminated between the catcher and the catcher plate to fabricate the flow geometry. The stress free fabrication process can be used to fabricate bond enhancing features into the catcher plate, and these bond enhancing features may be fabricated into the catcher plate concurrently with the fabrication of the flow geometry.

The invention has been described in detail with particular reference to certain preferred embodiments thereof, but it will be understood that modifications and variations can be effected within the spirit and scope of the invention.

What is claimed is:

1. A method for providing improved fluid flow within a catcher, having an associated catcher plate, of an ink jet printer system having an ink jet array and catcher means for collecting non-printed ink drops and returning the collected fluid to the fluid system, where the improved fluid flow provides uniform ink removal across the width of the ink jet array, comprising the steps of:

using a branched structure comprised of multiple pluralities of branches to create a flow channel geometry;

connecting each plurality of branches to a connecting trunk;

directing the flow from each plurality of branches down the connecting trunk, whereby the flow starts at outer branches and exits the catcher assembly at a lowest trunk or branching node, from which the fluid returns to the fluid tank.

2. A method as claimed in claim 1 wherein the plurality of branches from a given level of branching produce similar pressure drops.

3. A method as claimed in claim 1 wherein trunks from one plurality of branches form branches for another of the plurality of branches.

4. A method as claimed in claim 1 further comprising the step of minimizing pressure drops at the branching nodes.

5. A method as claimed in claim 1 further comprising the step of removing fluid from a top of the plurality of branches.

6. A method as claimed in claim 5 wherein the step of removing fluid further comprises the step of using a port perpendicular to a plane of flow channels to remove fluid.

7. A method as claimed in claim 1 further comprising the step of minimizing expansion losses at the branching nodes by funneling down the flow at the branching nodes.

8. A method as claimed in claim 1 wherein the trunk comprises a narrower channel than a combination of joined branches.

9. A method as claimed in claim 1 further comprising the step of using a stress free fabrication process to produce the flow geometry.

10. A method as claimed in claim 9 wherein the step of using a stress free fabrication process comprises the step of applying chemical etching.

11. A method as claimed in claim 9 wherein the step of using a stress free fabrication process comprises the step of using a masking process is fabricating the flow geometry.

12. A method as claimed in claim 1 further comprising the step of fabricating the flow geometry into the catcher plate.

13. A method as claimed in claim 12 further comprising the step of laminating spacers between the catcher and the catcher plate to fabricate the flow geometry.

14. A method as claimed in claim 12 further comprising the step of using a stress free fabrication process to fabricate bond enhancing features into the catcher plate.

15. A method as claimed in claim 14 further comprising the step of fabricating the bond enhancing features into the catcher plate concurrently with the fabrication of the flow geometry.

* * * * *